US007509278B2

(12) United States Patent
Jones

(10) Patent No.: US 7,509,278 B2
(45) Date of Patent: Mar. 24, 2009

(54) LONG-TERM INVESTING

(76) Inventor: W. Richard Jones, 30 Glenwood Rd., Louisville, KY (US) 40222

( * ) Notice: Subject to any disclaimer, the term of this patent is extended or adjusted under 35 U.S.C. 154(b) by 1530 days.

(21) Appl. No.: 10/015,003

(22) Filed: Dec. 11, 2001

(65) Prior Publication Data
US 2003/0014343 A1   Jan. 16, 2003

Related U.S. Application Data

(60) Provisional application No. 60/306,082, filed on Jul. 16, 2001.

(51) Int. Cl.
*G06Q 99/00* (2006.01)
(52) U.S. Cl. ..................... 705/36 R; 705/37
(58) Field of Classification Search ............ 705/36 R, 705/36, 35, 37
See application file for complete search history.

(56) References Cited

U.S. PATENT DOCUMENTS

| | | | | |
|---|---|---|---|---|
| 5,132,899 A | 7/1992 | Fox | ........................ | 364/408 |
| 5,193,056 A | 3/1993 | Boes | ........................ | 364/408 |
| 5,742,775 A | 4/1998 | King | ........................ | 395/238 |
| 5,761,441 A | 6/1998 | Bennett | ................... | 395/235 |
| 5,761,442 A | 6/1998 | Barr et al. | | |
| 5,799,287 A | 8/1998 | Dembo | ....................... | 705/36 |
| 5,806,049 A | 9/1998 | Petruzzi | ..................... | 705/36 |
| 5,812,987 A | 9/1998 | Luskin et al. | .............. | 705/36 |
| 5,819,237 A | 10/1998 | Garman | | |
| 5,819,238 A | 10/1998 | Fernholz | ................... | 705/36 |
| 5,832,461 A * | 11/1998 | Leon et al. | .................. | 705/38 |
| 5,852,811 A * | 12/1998 | Atkins | ....................... | 705/36 R |
| 5,911,135 A | 6/1999 | Atkins | ....................... | 705/36 |
| 5,933,815 A | 8/1999 | Golden | ....................... | 705/35 |
| 5,978,778 A * | 11/1999 | O'Shaughnessy | ......... | 705/36 R |
| 5,999,917 A | 12/1999 | Facciani et al. | ............. | 705/36 |
| 6,021,397 A * | 2/2000 | Jones et al. | ................ | 705/36 R |
| 6,029,148 A | 2/2000 | Zurstrassen | .................. | 705/36 |
| 6,035,286 A | 3/2000 | Fried | ........................... | 705/36 |
| 6,041,313 A | 3/2000 | Gilbert et al. | ................ | 705/36 |
| 6,061,662 A | 5/2000 | Makivic | ..................... | 705/36 |

(Continued)

OTHER PUBLICATIONS

Earnings basis for weighting stock portfolios, Pensions & Investments, Aug. 6, 1990, p. 1.*

(Continued)

*Primary Examiner*—James P Trammell
*Assistant Examiner*—Behrang Badii
(74) *Attorney, Agent, or Firm*—Wolf, Greenfield & Sacks, P.C.

(57) ABSTRACT

The present invention is a method, system and investment product for allocating or structuring investment assets (such as marketable securities, bonds, mortgages, or other property interests, options or derivatives). The system, method or product enables selecting or grouping a number of individual financial instruments together into a portfolio (e.g., a fund or trust) and assigning weight coefficients to the selected financial instruments based upon a predetermined scale. After assigning the weight coefficients, the system or method purchases the selected instruments based on the allocated total purchase for each instrument (i.e., the total price of each instrument reflects is the price per unit×number of units, which correspond the predetermined weight coefficient). Then, the purchased individual financial instruments are allowed to fluctuate and perform for a predetermined time period (i.e., a number of years and months) without any further significant adjustments to the initial portfolio.

36 Claims, 7 Drawing Sheets

U.S. PATENT DOCUMENTS

| | | | |
|---|---|---|---|
| 6,061,663 A * | 5/2000 | Bloom et al. | 705/36 R |
| 6,064,985 A * | 5/2000 | Anderson | 705/36 R |
| 6,078,904 A | 6/2000 | Rebane | 705/36 |
| 6,144,947 A | 11/2000 | Schwartz | 705/37 |
| 6,188,992 B1 | 2/2001 | French | 705/35 |
| 6,192,347 B1 | 2/2001 | Graff | 705/36 |
| 6,219,650 B1 | 4/2001 | Friend et al. | 705/36 |
| 6,226,623 B1 * | 5/2001 | Schein et al. | 705/35 |
| 6,317,726 B1 * | 11/2001 | O'Shaughnessy | 705/36 R |
| 6,601,044 B1 * | 7/2003 | Wallman | 705/36 R |
| 6,907,403 B1 * | 6/2005 | Klein et al. | 705/36 R |
| 6,920,432 B1 * | 7/2005 | Carey | 705/36 R |
| 7,016,873 B1 * | 3/2006 | Peterson et al. | 705/36 R |
| 7,149,713 B2 * | 12/2006 | Bove et al. | 705/36 R |
| 7,177,831 B1 * | 2/2007 | O'Shaughnessy et al. | 705/36 R |
| 2001/0042037 A1 * | 11/2001 | Kam et al. | 705/36 |
| 2002/0059123 A1 | 5/2002 | Dunning et al. | |
| 2002/0059126 A1 | 5/2002 | Ricciardi | |
| 2002/0059127 A1 | 5/2002 | Brown et al. | |
| 2002/0062271 A1 | 5/2002 | Breuninger | |
| 2002/0062272 A1 | 5/2002 | Kim et al. | |
| 2002/0069149 A1 | 6/2002 | Maxwell et al. | |
| 2002/0099636 A1 | 7/2002 | Narumo | |
| 2002/0133447 A1 | 9/2002 | Mastman | |
| 2002/0184126 A1 | 12/2002 | McIntyre, Jr. et al. | |
| 2003/0004846 A1 | 1/2003 | Schneider | |
| 2003/0009405 A2 | 1/2003 | Kiron et al. | |
| 2003/0018556 A1 | 1/2003 | Squyres | |
| 2003/0023532 A1 | 1/2003 | Bolt | |
| 2005/0171886 A1 | 8/2005 | Squyres | |

OTHER PUBLICATIONS

Hayles, G.C., Taking Stock in Market Analysis Software, Jul. 10, 1984, PC Magazine, vol. 3, No. 13, pp. 116-125.*
The Vanguard Group, Vanguard Gold and Precious Metals Fund Prospectus dated May 31, 2000.
Barclays Global Investors, iShares MSCI Series Prospectus dated Jan. 2, 2001.
Barclays Global Investor, iShares Russell Series; iShares S&P Series; iShares Dow Jones Series Prospectus dated May 12, 2000 (as revised Oct. 26, 2000).
Scudder Investments, Select Funds, Class AARP and Class S Shares Prospectus dated Jul. 1, 2000.
The Vanguard Group, Vanguard U.S. Stock Index Funds Prospectus dated Nov. 1, 2000.
Roger J. Bos, Standard & Poor's; Event Study: Quantifying the Effect of Being Added to an S&P Index dated Sep. 2000.
Roger J. Bos, Standard & Poor's; An Overview of Standard & Poor's Earnings and Dividend Quality Rank Model dated Jul. 2000.
Roger J. Bos, Standard & Poor's; An Overview of the Standard & Poor's 100 Index dated Dec. 2000.
Roger J. Bos, CFA, Michele Ruotolo, Standard & Poor's; General Criteria for S&P U.S. Index Membership dated Sep. 2000.
Scudder Investments, Scudder S&P 500 Index Fund, Prospectus dated Apr. 12, 2000.
Standard & Poors Index Services, S&P Global 1200 Index Changes 2001, S&P Global 1200 Index Changes 2000; http://www.spglobal.com/ssindexmain1200indchange.html.
Diamonds Trust, Series 1 Prospectus, Part A and Part B, The Dow Industrials, copyright 2001 by PDR Services LLC.
Nike Securities L.P. First Trust® (Prospectus) Jan. 23, 2002 (similar for years 2000, 2001) (50 pages).
Nike Securities L.P. First Trust® Communications Portfolio Series 10; http://www.nikesec.com/indiv/ftp/portfoliooverview.asp?fundid=2666&Trust=ccgr10 (4 pages).
Nike Securities L.P. First Trust® Biotechnology Portfolio Series 7; http://www.nikesec.com/indiv/ftp/portfoliooverview.asp?fundid=2669&Trust=btgr7 (5 pages).
Nike Securities L.P First Trust® Capital Goods Portfolio Series 1; http://www.nikesec.com/indiv/ftp/portfoliooverview.asp?fundid=2670&Trust=cggr1 (3 pages).
Nike Securities L.P. First Trust® Biotechnology Portfolio Features & Benefits; www.nikesec.com (2 pages).
Standard & Poor's Depository Receipts®, SPDR Trust, Series 1, Prospectus Part A Dated Jan. 24, 2001 (70 pages).
streetTRACKS Series Trust, Prospectus 79 pages; Oct. 26, 2001 (similar for 2000).
Broadband HOLDRS, Contract Specifications, Description of Product; http://www.amex.com/structuredeq/holdrs_bdh.stm (3 pages).
Standard & Poors Index Services, S&P Global Indices; http://www.spglobal.com/ssindexmain.html.
International Search Report issued in PCT Application PCT/US02/22574 on May 27, 2003.
International Search Report issued in PCT Application PCT/US02/22547 on Jun. 17, 2003.
Jones, Robert. "Earnings basis for weighting stock portfolios." Pensions and Investments. Aug. 6, 1990.
iShares Trust Supplement dated Aug. 17, 2005 to the Prospectus dated Aug. 1, 2005 for the iShares Russell and S&P Index Funds pp. 1-109.
Prospectus, NASDAQ-100 Trust, Series 1, Jan. 31, 2007.
Office action dated Jul. 13, 2007 from U.S. Appl. No. 10/984,338.
Office action dated Feb. 1, 2007 from U.S. Appl. No. 10/984,338.

* cited by examiner

TABLE I

| | | TIER I | TIER II | TIER III |
|---|---|---|---|---|
| FUND A | COMPANIES | 1-30 | 31-120 | 121-150 |
| | $ PER COMPANY | $2,500.00 | $1,666.67 | $833.33 |
| | SUB TOTAL | $75,000.00 | $150,000.00 | $25,000.00 |
| FUND B | COMPANIES | 151-260 | 261-590 | 591-700 |
| | $ PER COMPANY | $681.82 | $454.55 | $227.27 |
| | SUB TOTAL | $75,000.00 | $150,000.00 | $25,000.00 |
| FUND C | COMPANIES | 701-1060 | 1061-2140 | 2141-2500 |
| | $ PER COMPANY | $208.33 | $138.89 | $69.44 |
| | SUB TOTAL | $75,000.00 | $150,000.00 | $25,000.00 |

FIG. 3

TABLE II

| | | TIER I | TIER II | TIER III | TIER IV | TOTAL |
|---|---|---|---|---|---|---|
| FUND A | COMPANIES | 1-30 | 31-60 | 61-90 | 91-120 | |
| | $ PER COMPANY | 4,000.00 | 3,000.00 | 2,000.00 | 1,000.00 | |
| | SUB TOTAL | 120,000.00 | 90,000.00 | 60,000.00 | 30,000.00 | $300,000.00 |
| FUND B | COMPANIES | 121-240 | 241-360 | 361-480 | 481-600 | |
| | $ PER COMPANY | 900.00 | 675.00 | 450.00 | 225.00 | |
| | SUB TOTAL | 108,000.00 | 81,000.00 | 54,000.00 | 27,000.00 | $270,000.00 |
| FUND C | COMPANIES | 601-950 | 951-1300 | 1301-1650 | 1651-2000 | |
| | $ PER COMPANY | 300.00 | 225.00 | 150.00 | 75.00 | |
| | SUB TOTAL | 105,000.00 | 78,750.00 | 52,500.00 | 26,250.00 | $262,500.00 |
| FUND D | COMPANIES | 2001-3500 | 3501-5000 | 5001-6500 | 6501-8000 | |
| | $ PER COMPANY | 65.00 | 48.75 | 32.50 | 16.25 | |
| | SUB TOTAL | 97,500.00 | 73,125.00 | 48,750.00 | 24,375.00 | $243,750.00 |

FIG. 4

TABLE III

| | | ECONOMIC SECTOR 1 | ECONOMIC SECTOR 2 | ECONOMIC SECTOR 3 | ECONOMIC SECTOR 4 | ECONOMIC SECTOR 5 | ... | ECONOMIC SECTOR 11 |
|---|---|---|---|---|---|---|---|---|
| FUND A | COMPANIES | 4 | 2 | 7 | 3 | 6 | ... | 5 |
| | $ PER COMPANY | $11,000 | $3,500 | $2,500 | $14,000 | $6,000 | ... | $5,000 |
| | SUB TOTAL | $44,000 | $7,000 | $17,500 | $42,000 | $36,000 | ... | $25,000 |
| FUND B | COMPANIES | 15 | 11 | 36 | 28 | 45 | ... | 30 |
| | $ PER COMPANY | $900 | $1,000 | $750 | $1,100 | $750 | ... | $750 |
| | SUB TOTAL | $13,500 | $11,000 | $27,000 | $30,800 | $33,750 | ... | $22,500 |
| FUND C | COMPANIES | 65 | 47 | 112 | 98 | 167 | ... | 150 |
| | $ PER COMPANY | $150 | $160 | $115 | $212 | $87 | ... | $65 |
| | SUB TOTAL | $9,750 | $7,520 | $12,880 | $20,776 | $14,529 | ... | $9,750 |

FIG. 5

TABLE IV

| FUND P&B | TIER I | TIER II | TIER III |
|---|---|---|---|
| COMPANIES | 1-30 | 31-90 | 91-210 |
| $ PER COMPANY | ACCORDING TO BOND RATING | $2,500.00 | ACCORDING TO BALANCE SHEET STRENGTH |
| TOTAL | $300,000.00 | $150,000.00 | $100,000.00 |

FIG. 6

TABLE V

| | TIER I | TIER II | TIER III |
|---|---|---|---|
| FUND A<br>BEST 20% CAPITALIZED COMPANIES | LARGEST 15%<br>BY MARKET CAP | NEXT LARGEST 25%<br>BY MARKET CAP | REMAINING 60%<br>BY MARKET CAP |
| FUND B<br>NEXT 30% CAPITALIZED COMPANIES | LARGEST 15%<br>BY MARKET CAP | NEXT LARGEST 25%<br>BY MARKET CAP | REMAINING 60%<br>BY MARKET CAP |
| FUND C<br>BOTTOM 50% COMPANIES BY CAPITALIZATION | LARGEST 15%<br>BY MARKET CAP | NEXT LARGEST 25%<br>BY MARKET CAP | REMAINING 60%<br>BY MARKET CAP |

FIG. 7

LONG-TERM INVESTING

This application claims priority from U.S. Provisional Application No. 60/306,082 filed on Jul. 16, 2001, which is incorporated by reference.

BACKGROUND OF THE INVENTION

The present invention relates to diversified long term investing.

For centuries businesses have issued publicly traded securities to fund the business' operating capital or enable growth. There are two basic types of securities: bonds that represent debt, and stocks that represent ownership or equity interest in the issuing business. Bonds represent the promise of the business to pay a fixed sum at a specified maturity date plus interest at regular intervals until such date. There are numerous types of bonds such as convertible bonds, income bonds, or linked bonds. Stocks (or units) give an owner a right to a share of dividends and other distributions of the underlying business, to vote for directors and fundamental corporate changes, to inspect the accounting books of the business, and other rights defined by the charter and bylaws of the business as well as by the laws of the country or state in which it is chartered.

Overall, stock markets have provided an efficient way to raise capital. Performance of the entire market or individual market sectors may be monitored using different stock indexes. A stock index includes a selected group of stocks, wherein each stock affects the index in proportion to its relative weight. The relative weight can be selected based on market capitalization, market-share (i.e., number of outstanding shares), or price of the stocks. Thus, there are capitalization weighted indexes, market share-weighted indexes, or price-weighted indexes. Capitalization weighted indexes include NASDAQ Composite Index ®, S&P 500®, Wilshire indexes, Equity Index®, Russell Indexes®, and numerous other indexes. Price-weighted indexes include Dow Jones Industrial Average®, Dow Jones Transportation®, and Dow Jones Utilities®.

Stocks, bonds and numerous other financial instruments (e.g., derivatives, stock options, commodity futures or other options) can be held in various types of investment funds and trusts. An investment fund includes a portfolio of securities managed by a management company that serves as an investment adviser (and may also serve as a custodian, shareholder, servicing agent, transfer agent or provide some other secondary service). The management company or the investment advisor selects the financial instruments depending on the type of fund or trust. That is, there are various types of funds including stock funds (e.g., funds that invest in domestic or international stocks, growth or value stocks, small, medium or large capitalization stocks, etc.), bond funds (e.g., funds that invest in U.S government or foreign government bonds, mortgages, convertible bonds, low quality "junk" bonds, etc.), hedge funds, or funds that invest in two or more types of securities such as both stocks and bonds.

Mutual funds, also called open-end investment funds, have existed for decades. In a mutual fund, a shareholder owns a portfolio of financial instruments and receives dividends on the shares that he or she holds. Any day, a shareholder can sell or redeem any of its outstanding shares at net asset value (i.e., the price of a share equals total assets minus liabilities divided by the total number of shares) calculated at the end of a trading day. Similarly, an investor can also buy additional shares of a mutual fund, which in turn will invest the money. Thus an open-end fund can continue to increase its asset base by selling its shares to new shareholders and investing the influx of money in more shares.

There are "actively" managed mutual funds, where the advisor buys and sells securities based on his or her opinion about expected future performance. Here, the turnover ratio and thus the cost can be relatively high compared to index funds. There are also "passively" managed mutual funds where the fund advisor does not have much discretion and invests in a portfolio of securities that mirror a selected market index. Thus, in these funds, the cost is usually fairly low, but the funds have limitations related to the type of index followed, as described below.

Closed-end funds include actively managed or passive portfolios of stocks grouped according to an investment objective. Usually, after the initial sale, shares of closed-end funds are sold on a stock exchange the same way as stocks. Closed-end funds differ from open-end funds in that the number of shares is fixed. There are closed-end funds where a shareholder cannot exchange shares for underlying stock, which contributes to fluctuation of the price of the shares sometimes significantly above or below the net asset value. Low demand for a closed-end fund causes closed-end shares to trade at discounts to net asset value, and high demand creates premiums to the net asset value. In these funds, a shareholder cannot directly take advantage of the discount since he or she cannot exchange the fund shares for the underlying stocks. An investment advisor actively manages the fund, and the fund value (including any discounts or premiums) changes depending on the market conditions and skills of the advisor. Depending on the fund management, these funds may have a high turnover rate and thus high cost.

Passively managed funds are usually low cost, as mentioned above, because the advisor does not have much discretion to trade and thus does not have to have a team of highly compensated managers and analysts. There are numerous index funds that hold a portfolio of securities that mirror a selected market index. The advisor buys and sells the individual securities only when their representation in the underlying index changes, when investors redeem fund shares for cash or when investors purchase additional fund shares. These funds provide investment results that, before expenses, generally correspond to the price and yield performance of the index. As explained below, most indexes are heavily weighted toward large and midsize stocks. Furthermore, the indexes are periodically rebalanced, and the relative stock representation is reduced as a company grows and its stock moves from a micro cap index fund to a small cap index fund or to a mid cap index fund. Thus, the index funds do not effectively accumulate the best performing stocks because they are effectively sold as they move to a larger index fund.

Perhaps the oldest market index is the Dow Jones Industrial Average®. This index presently includes common stocks of 30 large companies. There are also other Dow Jones indexes such as the Dow Jones 20 Transportation Average®, or the Dow Jones 15 Utilities Average®, or the Dow Jones Composite Average®. The Dow Jones averages are calculated by adding together the prices of each stock's trading on a primary exchange and dividing the sum by a divisor, which is of course different for each index. The index divisor depends on the stock splits and is designed to maintain "continuity." When a new stock is included, or corporate actions are taken (such as spin-offs, company purchases, stock splits, etc.), the divisor is changed so that the index remains unaffected. The individual Dow Jones averages basically include issues of large companies each having market capitalization of several billions if not hundreds of billions of US dollars. Therefore, mutual funds or trusts based on the Dow Jones Averages do not include small cap or micro cap stocks discussed below.

The Wilshire index family provides a good example of indexes that track the entire market and the individual market segments. Wilshire 5000® equity index is a market value weighted index that includes all NYSE and AMEX stocks and the most active stocks traded on NASDAQ (the total includes over 6,500 securities). The included issues are common stocks, REITs and limited partnerships, all of which are selected based on volume, institutional holdings, and conversion criteria. For a company with multiple classes of stock, all shares are combined into the primary issue's shares to reflect the total market capitalization of the company. The index measures the performance of all U.S. headquartered equity securities with readily available price data. Thus, the Wilshire 5000 index encompasses virtually all of the entire U.S. stock market.

The Wilshire 4500® equity index measures the performance of all small and mid cap stocks. This index includes the Wilshire 5000 securities with the companies in the Standard & Poor's 500 Index removed thus including over 6,000 stocks. The Wilshire 4500® equity index includes capitalization-weighted representation of the included stocks.

The Wilshire large cap 750 index measures stocks of large companies with market capitalization of more than about $5 billion (an approximate value also depending on the overall market conditions). This index is a subgroup of the Wilshire 5000 index because it represents a market capitalization-weighted portfolio of the 750 largest companies in the Wilshire 5000 index.

The Wilshire mid cap 500 index measures stocks of mid-sized companies with market capitalization of less than about $5 billion. This cap-weighted index is a combination of 500 relatively large and midsize stocks ranked based on market capitalization from 501 to 1,000 in the Wilshire 5000 index.

The Wilshire small cap 1750 index measures stocks of companies with market capitalization of less than about $1 billion. This index is comprised of the next 1,750 stocks ranked by market capitalization from 751 to 2,500 taken from the Wilshire 5000 index. The Wilshire micro cap index measures stocks of companies with market capitalization of less than about $350 million. This cap-weighted index includes all stocks in the bottom half of the Wilshire 5000 Index, that is, stocks below the capitalization ranking of 2,501.

There are also numerous other Wilshire indexes such as the Wilshire large value index, the Wilshire large growth index, the Wilshire mid cap value index, the Wilshire mid cap growth index, and other indexes. The Wilshire large value index measures large-cap stocks that exhibit value characteristics (e.g. low price to book ratio). The Wilshire large growth index measures large-cap stocks that exhibit growth characteristics (e.g. high price to book ratio). Periodically, the above indexes are modified or "rebalanced" by adding and removing stocks. The rebalancing enables the indexes to provide a better reflection of stock market activity and performance. That is, rebalancing is done in an effort to have growth stocks included in the growth index, etc. Furthermore, rebalancing ensures that changes in valuation or market cap are periodically updated. The corresponding mutual funds then change their portfolio based on the index rebalancing.

The Russell index family is another widely recognized example of indexes that track the entire market and the individual market segments. Russell 3000® Index measures the performance of the 3,000 largest U.S. companies based on their total market capitalization, which represents approximately 98% of the investable U.S. equity market by market capitalization. This index has a total market capitalization range of approximately $480 billion to $140 million (on Jul. 1, 2001, but values depend on the market conditions).

Russell 1000® Index measures the performance of the 1,000 largest companies in the Russell 3000® index, which represents approximately 92% of the total market capitalization of the Russell 3000® Index. The smallest company in the index has an approximate market capitalization of about $1.3 billion. Russell 2000® Index measures the performance of the 2,000 smallest companies in the Russell 3000® Index; this represents approximately 8% of the total market capitalization of the Russell 3000® Index. In July 2001, the average market capitalization of a stock in Russell 2000® Index was approximately $530 million and the median market capitalization was approximately $410 million. The largest company in the Russell 2000® Index had an approximate market capitalization of $1.4 billion.

There are also other Russell indexes. For example, Russell 200® Index measures the performance of the 200 largest companies in the Russell 1000® Index, which represents approximately 75% of the total market capitalization of the Russell 1000® Index. Russell Midcap® Index measures the performance of the 800 smallest companies in the Russell 1000 Index, which represent approximately 25% of the total market capitalization of the Russell 1000® Index. Russell 2500® Index measures the performance of the 2,500 smallest companies in the Russell 3000® Index, which represents approximately 17% of the total market capitalization of the Russell 3000® Index.

Russell Small Cap Completeness® Index measures the performance of the companies in the Russell 3000® Index excluding the companies in the Standard & Poor's 500 Index.

Since index funds like the Wilshire 5000® and Russell 3000 are market cap weighted, usually only 10%-15% or less of an investor's money is allocated into the smallest 90% companies ranked by market capitalization. The 100 largest stocks receive an allocation of above 50% of the total amount invested. Generally, investors in index funds have no meaningful exposure to micro cap, small cap or even some medium sized companies, and frequently no exposure to many small cap or micro cap companies since they are not components of they index funds own.

There are index funds that invest in micro cap, small cap and medium sized companies, but these funds have an inherent disadvantage. As a high performing stock grows, its rank increases. When a high performing stock "graduates" from the Wilshire micro cap index, it is added to the Wilshire small cap index. Similarly, when a high performing stock "graduates" from Russell 2000®, it is added into Russell 1000®. In this "rebalancing", the high performing stock is "effectively sold" because its weighting in the new index is small compared to other members of the index. Moreover, when a stock graduates from Russell 2000® to Russell 1000®, investors in Russell 2000® no longer have any ownership interests of that particular security. Furthermore, in each index, only a small amount of money is allocated into the smaller components due to the disparity in market capitalization between the largest and smallest companies. Thus, in an index fund, an investor cannot effectively buy a meaningful amount of a micro cap or a small cap stock and "hold" the stock as is it grows and moves from one index to another. That is, in the above-described funds, an investor cannot fully take advantage of some high performing stocks by long-term ownership in a tax efficient way.

Actively managed, open-ended mutual funds generally dilute the impact of some of the best performing stocks because most active funds restrict the percentage weighting for an individual stock or sector. This too translates into effective selling of high performing stocks because they are not allowed to grow substantially in weight (increased ownership is artificially restricted) relative to the other stocks in the fund. To maintain investments in high performing companies, (i.e., allow nature to take its course) managers of open-end mutual funds would have to increase the dollar allocation into winning stocks as new money is invested into the fund in direct proportion to their existing relative weight to avoid dilution by new shareholders.

Frequently, most actively managed funds that specialize in investment in small or mid cap stocks sell the companies when they do well (e.g. their market cap exceeds a certain limit). Therefore, investors typically do not hold micro cap to medium sized stocks for a long enough period to "let the winners run". Most investment managers (advisors) usually do not hold individual stock for long periods of time. The holding period of most stocks in "managed" funds tends to be significantly less than 3 years because investment advisors try to predict future performance of a stock and/or they sell any stocks that no longer fit their select criteria. Frequently, they sell stock of growing small companies that no longer have characteristics in accord with the fund's objectives. For example, company's market cap is too large or stock is no longer a "value" stock. Thus, actively managed funds do not provide a solution that ensures long-term ownership of the best performing micro cap to medium sized stocks. In turn, the investors do not accrue the benefit that derives form long-term ownership of micro cap, small cap, or mid cap stocks that grow to achieve appreciably larger market capitalization.

A portfolio of stocks may also be arranged in a unit trust that operates differently than a mutual fund. A unit investment trust issues securities that represent an undivided ownership interest in the portfolio of stocks held by the trust. (For example, there are publicly traded shares of the DIAMONDS Trust®, which holds all of the 30 common stocks of Dow Jones Industrial Average.) In a unit trust, a trustee issues creation units to anyone who deposits with the trustee a specified portfolio of the securities and a cash payment generally equal to accumulated dividends. In general, the investment trust only issues Creation Units in specified large-sized minimum numbers (for example for the DIAMONDS Trust it is 50,000 DIAMONDS or multiples thereof). A creation unit holder can, however, purchase and sell the units on the secondary trading market in lots of any size. The unit holders are paid regularly an amount corresponding to the amount of any cash dividends on the Trust's portfolio of securities during the applicable period (minus the fees and expenses associated with operation of the Trust).

Some types of unit investment trust are structured so that the units are not individually redeemable, and can be redeemed only by tendering to the Trust the entire amount of the creation units (i.e., the creation unit-sized minimum number) or a multiple thereof). Upon delivery of the creation units, the Trust delivers a portfolio of the underlying securities (together with a cash payment generally equal to accumulated dividends as of the date of redemption). The trust always maintains the correspondence between the composition and weightings of securities held by the trust and the stocks in the corresponding index. Specifically, the DIAMONDS Trust includes 30 common stocks that are included in the Dow Jones Industrial Average. These stocks are adjusted to conform to periodic changes in the identity of the Dow Jones Industrial Average. Importantly, each of these 30 stocks have a much larger market capitalization than any small cap or micro cap stock (or even most mid cap stocks).

There are other investment trusts that hold a stock portfolio of a particular industry, sector or group designed to provide a diversified exposure to the industry, sector or a group. For example, Merrill Lynch provides HOLDRs® that are trust-issued receipts representing a beneficial ownership of a specified group of stocks. The owner of a particular HOLDR owns a group of stocks as one asset, but can also unbundle the HOLDR any time to own each of the underlying stocks. The unbundled stocks can be traded individually to meet specific tax or investment goals. HOLDRs are taxed only on gains and income that the owner actually realizes. Thus, HOLDRs allow the owner to take tax losses in any individual stock that declines and allow the owner to defer capital gains indefinitely on the best performing stocks. Furthermore, HOLDRs have a buy-and-hold feature that limits taxes resulting from portfolio turnover.

The individual HOLDRs are exchange-traded and are priced just like any other stock to provide liquidity. The owner retains the voting and dividend rights on the underlying stocks. HOLDRs provide a relatively inexpensive way to own about 19 to 20 stocks. The owner doesn't pay management fees, but pays a transaction costs and an annual custody fee taken against cash dividends and distributions, when they are issued.

An example of a HOLDR trust is a Biotech HOLDR trust, which holds the following 20 stocks (with the approximate initial weighting provided in parentheses): Applied Biosystems Group (6.67%), Affymetrix Inc (2.02%), Alkermes Inc. (0.76%), Amgen Inc. (19.76%), Biogen Inc. (9.92%), Chiron Corp. (4.78%), Celera Genomics (0.77%), Genentech Inc. (18.29%), Enzon Inc. (0.93%), Genzyme Corp. (2.99%), Gilead Sciences Inc. (2.97%), Human Genome Sciences Inc. (1.77%), ICOS Corp (1.29%), IDEC Pharmaceuticals Corp. (2.49%), Immunex Corp. (8.9%), Medimmune Inc. (6.03%), Millennium Pharmaceuticals Inc. (2.35%), Qlt Inc (2.42%), Sepracor Inc. (2.68%), and Shire Pharmaceuticals Grp. (2.2%). Thus, the Biotech HOLDR trust holds midsize to large stocks (stocks above $1.5 billion to tens of billion). In short, each of the existing HOLDS provides a relatively limited diversification and do not enable systematic investment in micro cap, small cap, mid cap and large cap stocks across the entire market.

There are also other unit investment trusts. For example, Nike Securities L.P. creates periodically First Trust® portfolios that are unit investment trusts holding a fixed diversified portfolio of typically about 20 to 25 stocks in one industry or market sector. The individual closed-end trusts trade on public exchanges to provide daily liquidity. The trusts typically have a life of 13 months to 5 years. Investors invest a minimum of about $10,000 (usually corresponding to 100 units). At the end of the term, the investors can get securities "in kind" without incurring tax liability or can get the corresponding monetary value. The trustee does not rebalance or does not otherwise manage the trusts over its lifetime. The First Trust® portfolios hold generally large to medium size stocks typically purchased initially at an equal dollar amount of each security. Basically, each of the First Trust® portfolios provides a relatively limited diversification and does not enable systematic investment in small cap or micro cap stocks.

In summary, the above-described funds or trusts have at least some disadvantages. Most market cap weighted funds or trusts allocate most of the invested money in large or very large companies. Passive, open-end index funds allocate new money in direct proportion of the market cap of each company, as specified for the corresponding index. Thus, investors money is usually allocated in an overwhelming fashion to companies having large to extremely large market capitalization. These companies tend to be more mature (and thus frequently have lower earnings growth) or tend to have higher relative valuations (i.e., very "popular" companies) than some younger, smaller, less "popular" companies. As explained above, small cap and micro cap index funds "effectively" sell small stock of fast growing companies.

Actively managed funds also tend to allocate investors' money based upon narrow characteristics or on market capitalization and tend to have a high turnover ratio. They also do not hold small cap and micro cap companies for many years to let "the winners run." These funds also tend to restrict the relative weighting of the individual stocks. Therefore, there is a need for methods, systems and investment products that enable systematic, long-term investing in various market sectors or segments including mid size, small cap, or micro cap companies.

SUMMARY OF THE INVENTION

The present invention is a method, apparatus and investment product for allocating or structuring investment assets (such as marketable securities, bonds, mortgages, or other property interests, options or derivatives). The apparatus, method or product enables selecting or grouping a number of individual financial instruments together into a portfolio (e.g., a fund or trust) and assigning relative weighting to the selected financial instruments. That is, the total purchase of each instrument (i.e., per unit price×number of units) is allocated based on a weight coefficient. The weight coefficients for the selected financial instruments are based upon a predetermined scale. After assigning the relative weighting (i.e., weight coefficients), the apparatus or method purchases the selected instruments based on the allocated total price for each instrument. Then the purchased individual financial instruments are allowed to fluctuate and perform for a predetermined period without any further significant adjustments to the initial portfolio. The portfolio is passive, but there may be insignificant adjustments when there are cash dividends (or interest payments on the instruments) or capital market transactions (e.g., mergers, acquisitions, spinoffs, and the like).

The present method, apparatus and investment product provide improved returns when compared with many prior art passive investment strategies, by systematically investing in different market cap stratas based on a preselected weighting and then maintaining the selected portfolio for many years. The present method, system and investment product enables a long ownership of most successful securities without inherent problems associated with basing the allocation on relative market capitalization as done in market cap weighted indexes.

The present method, system and investment product provide a substantially passive portfolio holding financial instruments for a long period of time. The portfolio is substantially passive (and not necessarily 100% passive) since a manager may allow reinvestment of dividends, or receipt of new shares, or sale of some minor amounts of shares from spinoffs, mergers or the like. Minor proceeds may be distributed to shareholders, or put into a money market fund. If a certain company goes out of business, it is not replaced by another stock in the portfolio as is done with the index funds. If a security is exchanged for another security in the event of an acquisition, investors would then own the new (acquirer's) shares.

The present method, system and investment product provide investors with the ability to invest in a large number or all mid cap or small cap stocks and then over time realize the aggregate investment result that these stocks generate. The selected stocks or securities are kept in the created fund or trust and are not sold due to a large increase in value (e.g., are not sold when moving from one index fund to another), nor are they be sold because they no longer are deemed to have merit by one or more investment managers (that is, managers may sell a security because it no longer has a selected characteristic, e.g., has lost momentum, is too expensive, too large market cap, etc.). The present method, system and investment product enable investors to know that they will own a medium size or large, diversified portfolio of securities for a predefined, known minimum time period.

The present method, system and investment product enable diversification or improvement of investment performance and lower volatility by periodically investing at regular intervals in the trusts or funds created according to construction and selection criteria described herein.

According to one embodiment, when the portfolio is held as an investment trust dividends can be reinvested to replicate the experience of an owner who purchased and held and reinvested the proceeds of any stock. For example, the trust can reinvest any cash generated via "all cash" acquisitions of any company in the portfolio. Alternatively, the trust can distribute any "all cash proceeds" directly to investors, or can deposit (i.e., re-invest) any "all cash" proceeds into a money market fund until the trust terminates. These transactions are considered insignificant adjustments.

According to another aspect, an asset portfolio includes a number of publicly traded financial instruments purchased according to corresponding individual weight coefficients allocated by giving the largest allocation to an instrument (or several instruments) having the largest market capitalization and giving the smallest allocation to an instrument (or several instruments) having the smallest market capitalization in the group of selected financial instruments, wherein the ratio of the largest weight coefficient and the smallest weight coefficient is limited by a selected maximum, wherein the individual financial instruments are then maintained for a selected number of years regardless of market conditions. Preferably, one, two or several additional weight coefficients (being in size between the largest weight coefficient and the smallest weight coefficient) are allocated to individual instruments.

According to yet another aspect, an asset portfolio includes a number of publicly traded stocks purchased according to individual weight coefficients allocated by giving the largest weight coefficient to a stock (or several stocks) having the largest market capitalization and giving the smallest weight coefficient for a stock (or several stocks) having the smallest market capitalization among the selected number of the stocks, wherein the ratio of the largest weight coefficient and the smallest weight coefficient is limited by a selected maximum being less than 400 and preferably less than 300 or 200, and more preferably less than 100, wherein the individual stocks are maintained for an initially selected number of years regardless of performance of any one of the stocks. Importantly, when the portfolio is created, there is always a selected maximum ratio that assures meaningful representation of mid cap, small cap and even micro cap stocks. In some cases, the ratio may be 75, 50, 25 or even less depending on the criteria based on which the stocks were selected.

According to yet another aspect, an asset portfolio includes a number of at least fifty publicly traded stocks purchased according to individual weight coefficients representing relative values between the stocks, wherein the purchased stocks are substantially maintained for an initially selected number of years regardless of any relative change in the market capitalization of any of the stocks.

According to yet another aspect, an asset portfolio includes a number of at least fifty publicly traded stocks purchased according to individual weight coefficients allocated by arranging the selected stocks based on their market capitalization, wherein one third of the selected stocks with the smallest market capitalization is allocated corresponding weight coefficient (or weight coefficients) that assure at least fifteen percent of the entire value of all the stocks for the one third of the selected stocks.

According to yet another aspect, a computer program product stored on a computer readable medium includes a representation of a number of at least fifty publicly traded stocks purchased according to corresponding individual weight coefficients allocated by arranging the selected stocks based on their market capitalization, wherein one third of the selected stocks with the smallest market capitalization is allocated corresponding weight coefficients that assure at least fifteen percent of the entire value of all the stocks for the one third of the stocks.

According to yet another aspect, a method of investing in marketable securities includes the acts of grouping a number of individual publicly traded securities on an exchange; assigning relative individual weight coefficients to the selected securities by giving a security (or securities) with the largest market capitalization a higher weight coefficient than the securities that have smaller market capitalization, wherein the relative weighting does not conform to actual market capitalization differences among the selected securities. This method also includes purchasing the selected securities based on the weight coefficients representing relative values between the securities along a predetermined proportional scale; and then allowing the individual securities to fluctuate for a predetermined number of years without any further adjustments to the initial allocation.

According to yet another aspect, a method of creating an investment portfolio includes the acts of selecting a number of individual financial instruments publicly traded on an exchange; allocating individual weight coefficients to the selected financial instruments by giving the largest allocation to an instrument (or several instruments) having the largest capitalization and giving the smallest allocation to an instrument (or several instruments) having the smallest capitalization for the selected number of the financial instruments, wherein the ratio of the largest weight coefficient and the smallest weight coefficient is limited by a selected maximum. The method also includes purchasing the selected financial instruments based on the weight coefficients representing relative values between the individual financial instruments; and maintaining substantially the purchased financial instruments for a selected number of years regardless of market conditions.

Preferably, the financial instruments include one or more of the following: common stocks, derivatives, stock options, commodity futures, or bonds. The selected maximum ratio assures meaningful representation for all selected instruments.

According to yet another aspect, a method of creating an investment portfolio includes the acts of selecting a number of stocks publicly traded on a stock exchange, the number of stocks being larger than 50 (and more preferably larger than 100); allocating individual weight coefficients corresponding to the selected stocks; purchasing the selected stocks based on the weight coefficients representing relative values between the individual stocks; and maintaining substantially the purchased stocks for a selected number of years regardless of a market capitalization of any of the stocks.

Preferably, the selected number of years is more than 2 years, and more preferably more than 3 years and as long as 10, 15 or even 30 years. Alternatively, the selected number of years is the number of years to retirement of an individual (or an average number for a group of individuals). Alternatively, the selected number of years is the number of years remaining until college attendance for an individual (or an average number of years remaining for a group of individuals). The purchasing act includes purchasing the selected stocks based on the allocated weight coefficients.

Preferably, the act of maintaining substantially includes allowing reinvestment of dividends into the same securities that paid the dividends. The act of maintaining substantially includes receiving new shares from spin-offs, mergers, acquisitions or the like. The act of maintaining substantially includes putting cash portion of proceeds into a money market fund. Alternatively, the act of maintaining substantially includes distributing proceeds to investors. Alternatively, the act of maintaining includes reinvesting the proceeds of an acquisition into the appropriate number of shares of the acquirer.

Preferably, the selecting act includes identifying stocks of about 1000, 2000, 3000, 4000, 5000, 6000, or 7000 largest publicly traded companies.

Preferably, the selecting act includes identifying stocks of publicly traded companies in a particular market segment or in a particular market sector. The sector is one of the following: technology, biotechnology, health case, information technology, telecommunications, semiconductor, energy, utilities, transportation, or any other sector (another sector).

Preferably, the act of allocating includes dividing the selected stocks into three groups based on their capitalization and allocating the same weight for all the stocks in each of the groups. For example, the first, second and third group includes 20 percent, 60 percent and 20 percent of the number of stocks in each group, respectively. The relative weight within each group enables further differentiation, wherein, for example, the largest companies placed in the first group receive 3× the weight coefficient of the smallest companies placed in the third group, and the middle companies placed in the second group receive 2× the weight coefficient of the smallest companies placed in the third group.

Preferably, the method further includes creating a mutual fund, a closed-end fund, a trust, a unit investment trust, or an individually constructed portfolio.

The present investment products can be structured as trust-issued receipts that represent a beneficial ownership of a specified group of stocks. The trust receipts are exchange-traded securities that are priced just like any other publicly traded stock. The owner owns a group of stocks as one asset, but may also unbundle the receipts at periodic, predefined intervals in order to own each of the underlying stocks. This option, if desirable, would be initially specified when a trust or a fund is created. When held as trust-issued receipts, the owner still retains the voting and dividend rights on the underlying stocks. The owner can tailor the ownership according to his or her tax needs by timing the capital gains or losses. The owners of trust-issued receipts can unbundle the receipts at periodic intervals to own each of the underlying stocks. The unbundled stocks can be traded individually to meet specific investment goals or tax goals (realize capital gain or capital loss, or donate the securities).

The present trust includes one or several unmanaged stock portfolios that are not significantly altered over several years by additional purchases, exchanges or sales of the individual stocks The present method, system and investment product provides the ability to systematically invest in the entire market overtime without investing 90% of the money in the top 1000 (or less) companies or having the future best performing stocks sold out of a small cap or mid cap stock fund, as these stocks grow. The present method, system and investment product envisions formation of similar trusts at regular time intervals. The present method, system and investment product helps to ensure optimal returns because more shares of future "winners" are acquired when their prices are low and fewer when they are high (as is done using another method called "dollar cost averaging").

The present method, system and investment product ensures that investors can systematically invest their money so that they do in fact have significant and long-term ownership of all future winners. The future winners are often younger companies that generate substantially above average earnings gains over many years. Younger companies that achieve a stream of increased earnings, sales, dividends and/or cash flow often are accorded a rising investment appraisal (P/E expansion) over time. The combination of healthy earnings gains plus enhanced valuation parameters translates into high stock performance. The present method, system or investment product enables investors who desire long-term growth of principal to systematically allocate their money in a significant way to large number of micro cap, small cap and midsize companies thereby ensuring the investors' ability to capture systematically the rewards of long-term ownership of tomorrow's high performance stocks.

The present method and system provide investment products that are tax efficient since they allow growth of the invested capital without taxable events (except corporate dividends or when a security is acquired for cash by another corporation).

BRIEF DESCRIPTION OF THE DRAWINGS

FIG. 3 includes Table I depicting a first example of a long-term investment portfolio.

FIG. 4 includes Table II depicting a second example of a long-term investment portfolio.

FIG. 5 includes Table III depicting a third example of a long-term investment portfolio.

FIG. 6 includes Table IV depicting a fourth example of a long-term investment portfolio.

FIG. 7 includes Table V depicting a fifth example of a long-term investment portfolio.

DESCRIPTION OF PREFERRED EMBODIMENTS

Figure 1:
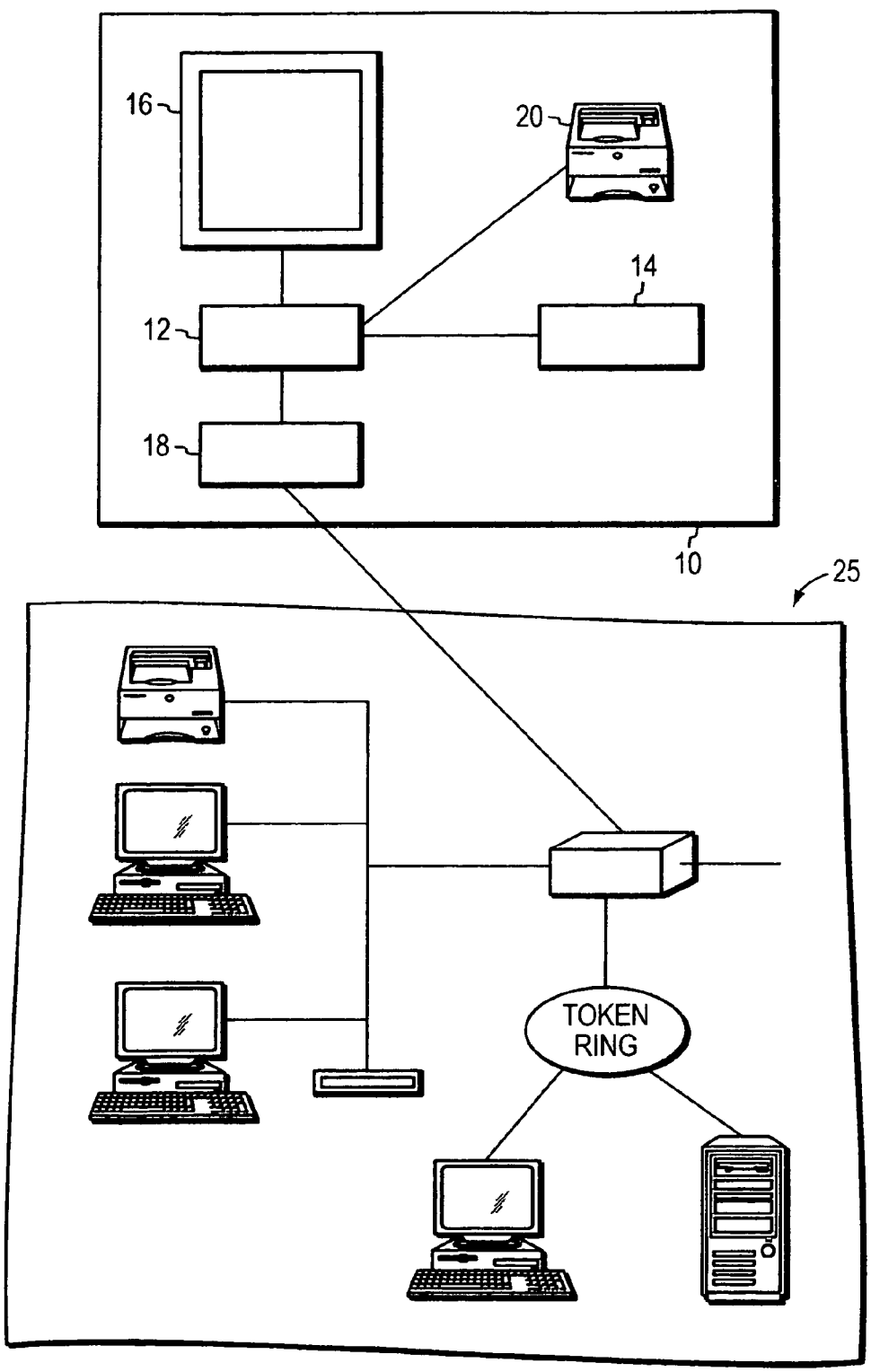
FIG. 1 shows a computerized system for setting up and managing one or several long-term investment portfolios.

FIG. 1 illustrates a computer apparatus for constructed and arranged to execute and manage the present investment product. Computer system 10 is connected to a communications network 25 for automatically setting up and managing a long-term investment portfolio (e.g., trusts, funds or similar investment vehicles) described below. Computer system 10 includes a processor 12, a memory 14, a display 16, an interface card 18, and a printer 20. Using interface card 18 connected to communications network 25, computer system 10 can connect to an electronic bulletin board or the NYSE super DOT (Direct Order Turnaround) system for trading. Computer system 10 can also connect to other computerized databases that provide share prices, bond prices, bond ratings, categories of shares, and other data related to publicly traded companies.

Figure 2:
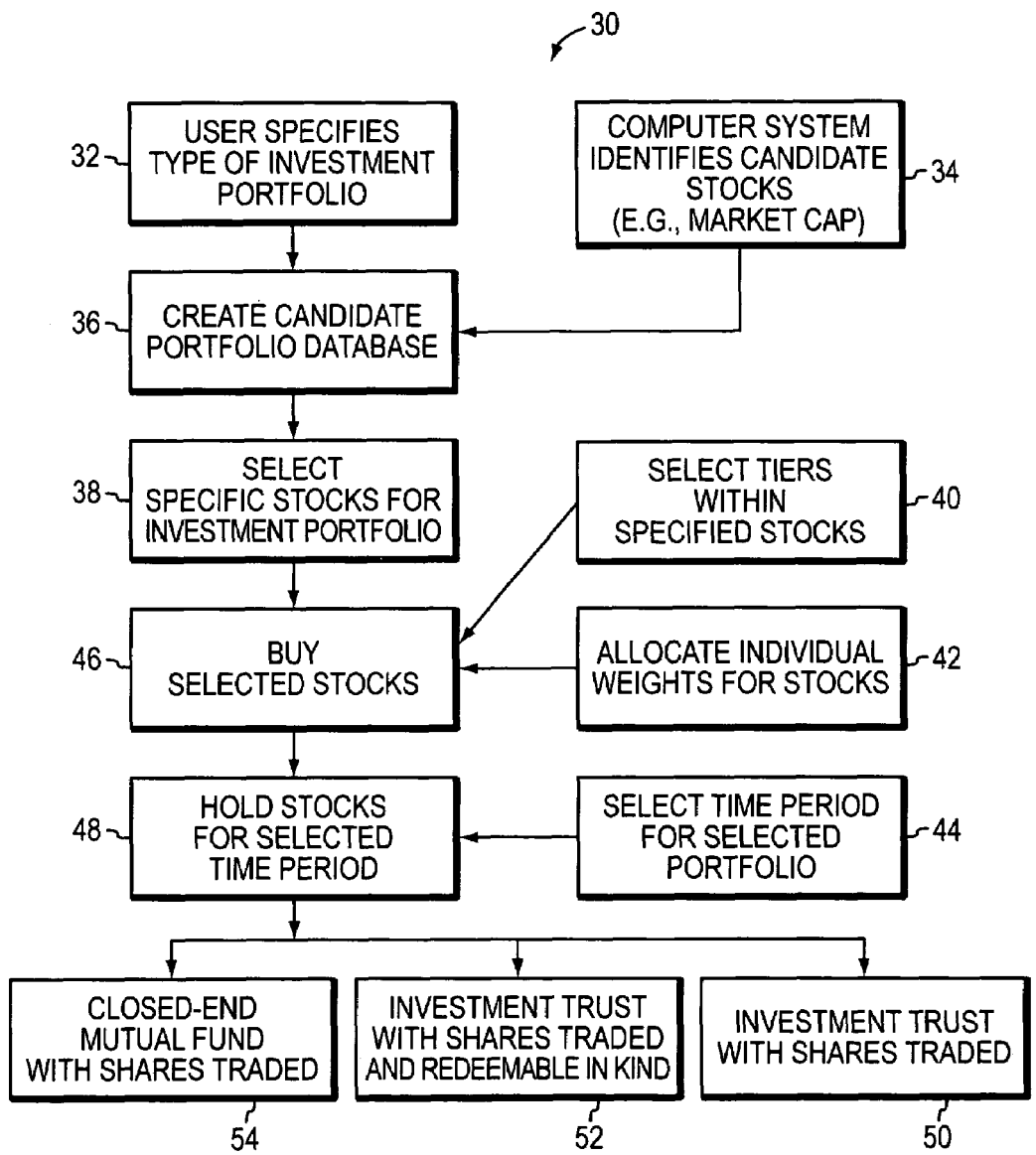
FIG. 2 shows a high level flow diagram illustrating a method for setting up a long-term investment portfolio.

Referring to FIG. 2, based on a user's input, computer system 10 initiates purchase of financial instruments (e.g., stocks, bonds, options) when initially creating an investment portfolio according to an algorithm 30. In step 32, the user specifies the types of one or several investment portfolios including the sizes and types of companies, the types of financial instruments and other information discussed below. A user may initiate identification of a market segment, for example, 5000 largest companies or 2000 smallest companies according their market capitalization. A user can also request computer system 10 to identify companies in a particular market sector such as telecommunication, pharmaceuticals, biotechnology, steel, transportation, semiconductors, computer hardware, computer software, oil and gas, chemicals, cosmetics, food and beverage, retail etc.

In step 34, computer system 10 automatically identifies possible candidates, calculates their market capitalization (price-to-earning, price-to-sales, book-to-price, etc.) and provides their names, and other related information. Computer system 10 creates candidate portfolio database (step 36). The user selects from the candidate portfolio database a number of specific stocks to be included in the investment portfolio (step 38).

Based on the user's input (or predefined criteria), computer system 10 allocates individual weights corresponding the selected financial instruments. Computer system 10 can allocate the selected financial instruments into several groups based on their market capitalization (step 40) or other characteristics and can allocate the same weight coefficient or different weight coefficients for each group (step 42).

For the selected financial instruments, computer system 10 may use several weighting schemes such as giving a larger weight coefficient to an instrument having a larger capitalization and giving a smaller weight coefficient for an instrument having a smaller capitalization. This weighting scheme usually includes a selected limit for the ratio of the largest weight coefficient and the smallest weight coefficient. This ratio has a limit of about 500, and preferably a limit of about 250, and preferably a limit of about 100. However, there are portfolios where the desired preselected limit of this ratio is about 50, or 30, or as low as 20, depending on the way the instruments are selected (e.g., a market segment or sector) and depending on the number of selected instruments. The selected limit assures a "meaningful" representation of mid size, small cap and micro cap stocks. Alternatively, another weighting scheme may also be based on bond ratings, amount of debt cash flow, growth rate, price-to-earnings ratio (P/E), P/E to growth ratio, and other criteria of the selected companies.

Computer system 10 purchases the selected financial instruments based on their assigned weights (step 46). In addition to large and mid size companies, the purchased portfolio includes small cap or micro cap companies having significant relative representation (based on the limit of the ratio of the largest weight to the smallest weight). This financial portfolio is maintained in the form of a selected structure (e.g., fund, investment trust) for a number of years initially selected in step 44. This number of years is at least two years, but preferably 4, 5, 6 or 7 years, or even 10 to 15 years.

The created portfolio is substantially passive for the selected number of years. That is, the original purchase is kept for the selected number of years regardless of market conditions or individual stock performance (i.e., stocks are left untouched by a manager thus allowing nature to take its course). The portfolio is essentially passive but the fund or trust rules (registration, prospectus) may allow reinvestment of dividends or receipt of new shares or sale of some minor amounts of shares from spin-offs or mergers. Minor proceeds may be distributed to shareholders or put into a money market fund. If a certain company goes out of business, it is not replaced by another stock in the portfolio as is done with the index funds. Computer system 10 provides periodic updates about the net asset value of the portfolio.

The above-described portfolio can have several different forms (and thus the creation process will involve different formalities). A portfolio (as shown for example in Table I) is structured as a closed end investment trust. The shares of this investment trust may be sold by private placement or are traded on a stock exchange. The shares are either redeemable in the form of the cash value of the underlying securities or are redeemable "in kind" in the form of securities, or both. When redeeming the shares in kind, the shareholder receives the actual securities with the original cost basis so that capital gains taxes may be deferred. Portfolios may possibly be structured to offer "in kind" distribution at regular intervals (e.g., once per year or quarter). This would enable a shareholder to sell selected received securities to realize a tax loss or realize tax gain at their election. Alternatively, the portfolio (for example shown in Table II) could be structured as a closed end mutual fund. The shares of this closed end mutual fund are traded on a stock exchange, but the stocks would not be redeemable in kind.

Computer system 10 can set up several different investment portfolios over time, directed to different market segments or different market sectors (e.g., telecommunication, pharmaceuticals, biotechnology, steel, transportation, semiconductors, computer hardware, computer software, oil and gas, chemicals, cosmetics, food and beverage, retail etc.). These investment portfolios can be bundled together.

The created long-term investment portfolio provides a platform for capturing the long-term performance of future winners. Preferably, the investment portfolio invests in each stock found in two, three or more market cap strata. The trusts include long duration substantially passive, non-managed stock portfolios. In the created trusts, over lengthy periods, the impact of stocks that generate above average performance is significantly greater than those stocks that contribute modestly or lose value. Furthermore, the long-term investment portfolio ensures that a significant amount of an investor's money is more widely allocated among a larger number of companies compared to the market cap weighted index funds that concentrate investors' capital on the basis of current capitalization.

The above-described trusts are established on a regular basis and each unique trust has duration of a pre-selected number of years. The trust may include one type of shares covering all included funds or several types of shares separately corresponding to different funds (e.g., shares A, B, and C corresponding to Fund A, B, and C described in connection with Table I. The shares may be sold by private placements, on a public stock exchange, etc. Financial advisors can put these stocks into "wrap" fee-based accounts.

Referring to Table I provided in FIG. 3, for example, an advisor or trustee allocates money among three funds that encompass the 2500 largest stocks by market capitalization in the U.S. market (and/or international stocks or stock of any country having an exchange). In the present investment system, method or product, the term fund is used generically as a portfolio of stocks and is not limited to an investment trust or mutual fund.

Referring still to Table I, the following are some of the characteristics of the three trust funds. An advisor or trustee allocates one third of the total invested funds into each of the three Funds "A", "B" and "C". Fund A is made up of the 150 largest companies by market capitalization in the U.S. market. Fund B is comprised of the next 550 largest companies (i.e., companies 151 to 700). Finally, Fund C contains the next 1800 largest companies (i.e. companies 701 to 2500). In this example, the largest 20% of the companies in each Fund (i.e., Funds A, B and C) get a weighting of 3× compared the smallest 20% while the middle 60% are each allocated 2× that of the smallest 20% in each fund as shown in Table I. That is, the allocated total purchase (stock price×number of shares) for each of the 20% largest companies is 3× the allocated total purchase (stock price×number of stocks) for each of the 20% smallest companies and the weight coefficients are 3:1.

For example, each Fund A, B and C has an initial capital allocation of $250,000. Referring to Table 1 in Fund A, each Tier 1 company receives an allocation of $2,500.00 (i.e., the total purchase of this company's stock is its stock price× number of shares). Based on this allocation, each company in Fund A, Tier 1, receives 1.0% of the initial capital of Fund A, and allocation of 0.33% of the total of Funds A, B and C. Therefore, the 30 companies in Fund A have $75,000 allocated into them, which is 10% of the total of Funds A, B and C and 30.0% of the Fund A's allocation.

In Fund A, each Tier II company receives an allocation of $1,666.67 (i.e., the total purchase of each company's stock is $1,666.67). Based on this allocation, each company in Fund A, Tier II receives 0.66% of Fund A's allocation or 0.22% of the total of Funds A, B and C. Therefore, the 90 companies in Tier II of Fund A have $150,000 allocated into them which is 20% of the total of Funds A, B and C, and 60.0% of Fund A's allocation.

In Fund A, each Tier III company receives an allocation of $833.33. That is, each company in Fund A, Tier III receives 0.33% of Fund A's allocation or 0.11% of the total of Funds A, B and C. Therefore, the 30 companies in Tier III have $25,000 allocated into them which is 3.33% of the total of Funds A, B and C, and 10.0% of Fund A's allocation.

Referring still to Table I, in Fund B, each Tier I company receives an allocation of $681.82. Therefore, the 110 companies in Fund B have $75,000 allocated into them, which is 10% of the total of Fund A, B and C, and 30.0% of Fund B's allocation. In Fund B, each Tier II company receives an allocation of $454.55. Therefore, the 330 companies in Tier II of Fund B have $150,000 allocated into them which is 20% of the total of Fund A, B and C, and 60.0% of Fund B's allocation. In Fund B, each Tier III company receives an allocation of $227.27. Therefore, the 110 companies in this group of Fund B have $25,000 allocated into them which is 3.33% of the total of Fund A, B and C, or 10.0% of Fund B's allocation.

Referring still to Table I, in Fund C, each Tier I company receives an allocation of $208.33. Therefore, the 360 companies in this group of Fund C have $75,000 allocated into them which is 10% of the total of Fund A, B and C, and 30.0% of Fund C's allocation. In Fund C, each Tier II company receives an allocation of $138.89. Therefore, the 1080 companies in this group of Fund C have $150,000 allocated into them which is 20% of the total of Fund A, B and C, and 60.0% of Fund C's allocation. In Fund C, each Tier III company receives an allocation of $69.44. Therefore, the 360 companies in this group of Fund C have $25,000 allocated into them which is 3.33% of the total of Fund A, B and C, and 10.0% of Fund C's allocation.

In summary, companies 1-30 in Fund A, Tier I have $75,000 invested in them, which is 3.0 times more than $25,000 invested in companies 2141 to 2500 located in Fund C, Tier III. Therefore, regarding the weighting with respect to the company size, the largest ratio is $36 invested in each company in Fund A, Tier I for each $1 invested in each company Fund C, Tier III. That is, the ratio of the largest weight coefficient and the smallest weight coefficient is 36. This is dramatically different than the weighting in the Russell 3000 ® or Wilshire 5000® index.

The above described Funds A, B and C include another important advantage. An investor can invest separately into Funds A, B or C. For instance if an investor already had significant holdings in large capitalization stocks via ownership of a S&P 500 index fund (or a Wilshire 5000® index fund), she may just choose to invest just in Fund C. This enables an investor to diversify her holdings vis-à-vis a one time contribution into all three Funds A, B or C or via making contributions into a series of these "closed end trusts" over time.

An investment trust that includes Funds A, B and C illustrates the proposed buy and hold approach. An investor can buy separately Funds A, B, or C. Funds A, B and C enable systematic investment across the broad market and then enable time and the laws of compounding work for long-term investors. That is, the trust includes unmanaged stock portfolios that are not significantly altered over several years.

Referring to FIG. 4, Table II shows an example of a total market investment trust. This total market investment trust includes four funds that include 8000 largest stocks by market capitalization in the U.S. market. (Eight thousand stocks is likely the upper limit from a practical standpoint.) Specifically, the investment trust includes four Funds "A", "B", "C" and "D" having a comparable amount of money invested in stocks. Fund A includes the 120 largest companies in the U.S. market. Fund B includes the next 480 largest companies (i.e., companies 121 to 600). Fund C includes the next 1400 companies (i.e., companies 601 to 2000), and Fund D includes the next 6000 companies (i.e., companies 2001 to 8000). In this example, the largest 25% of the companies in each fund get a weighting of 4× compared the smallest 25% (i.e., the weight coefficients are 4:1), while the next 25% companies are each allocated 3× (i.e., the weight coefficients are 3:1), and the next 25% companies 2× the amount of the smallest 25% in each fund as shown in Table II.

Referring still to Table II, Fund A has companies divided into four tiers each tier having 30 companies. In Fund A Tier I, each of the 30 largest companies receives an allocation of $4000.00, in Tier II each of the 30 companies receives an allocation of $3,000.00, in Tier III each of the 30 companies receives an allocation of $2,000.00, and in Tier IV each of the 30 companies receives an allocation of $1,000.00.

Fund B has companies divided into four tiers each tier including 120 companies. In Fund B, Tier I, each company receives an allocation of $900, in Tier II each company receives an allocation of $675, in Tier III each company receives an allocation of $450, and in Tier IV each company receives an allocation of $225. Similarly, Fund C has 1400 companies divided into four tiers each tier including 350 companies. In Fund C, Tier I, each company receives an allocation of $300, in Tier II each company receives an allocation of $225, in Tier III each company receives an allocation of $150, and in Tier IV each company receives an allocation of $75. Finally, Fund D has 6000 companies equally divided into four tiers. In Fund D, Tier I, each company receives an allocation of $64.00, in Tier II each company receives an allocation of $48.00, in Tier III each company receives an allocation of $32.00, and in Tier IV each company receives an allocation of $16.

The investment trust shown in Table II divides 27.9% to the 120 largest companies, 25.1% to the next 480 largest companies, 24.4% to the next 1400 companies, and 22.65% to the next 6000 companies. Furthermore, the ratio of the largest weighting and the smallest weighting is 250. Therefore, the small cap and micro cap companies included in Fund C and Fund D have a significant representation. This representation is much larger than for most index funds. For example, in Russell 3000® Index, the bottom 2000 stocks represent only 8% of the total funds invested. The investment trust shown in Table II is maintained without any rebalancing for several years, usually more than five years. Thus, the best performing medium cap, small cap and micro cap companies can grow without being effectively sold as they grow. Furthermore, this investment trust has a relatively large representation of small cap and micro cap companies.

As with the prior example, the investment trusts including funds A, B, C and D enables systematic investment across several segments of the market. After purchasing the above-described stock portfolio, the trust is basically passive (no significant stock purchases, sales or exchanges of individual companies) in order to enable time and the laws of compounding to work for long-term investors.

According to another example, an investment trust has five funds, i.e., Funds A, B, C, D, and E. Fund A has top 50 companies according to market capitalization. Fund B has next 150 companies, Fund C has next 400 companies, Fund D has next 1,000 companies, and Fund E has the bottom 2000 companies from the selected 3,600 companies. In each of the funds, the dollar allocation for all companies is the same (i.e., the companies receive the same weight coefficient). In Fund A, each of the 50 largest companies receives a dollar allocation of 25× allocation of a company from Fund E; in Fund B, each of the 150 companies receives an allocation of 15×; in Fund C each of the 400 companies receives an allocation 8×; and in Fund D, each of the 1000 companies receives an allocation of 3× the allocation of a company from Fund E. That is, the respective weight coefficients for funds A, B, C, D, and E are 25, 15, 8, 3 and 1. If the total of 1,170,000 is invested into this investment trust, for example, each company in Fund A will be allocated $2500; each company in Fund B will be allocated $1500; each company in Fund C will be allocated $800; each company in Fund D will be allocated $300; and each company in Fund E will be allocated $100.

Referring to FIG. 5, Table III provides another example of an investment trust. This investment is based on 11 economic sectors and may include the largest 1000 or 2000 or 3000 by market capitalization. For example, the largest 1000 companies are placed into 11 different economic sectors (i.e., Sector 1 through 11 shown in Table III). This investment trust includes three separate funds, wherein Fund A includes the top decile companies for each sector, Fund B includes the next 3 deciles of the selected 1000 companies for each sector, and Fund C includes the remaining 60% of companies for each sector.

The present investment trust does not have in each Sector (or Tier) the same number of companies, nor does each stock get the same dollar allocation. Furthermore, each sector gets a different total allocation. This allocation provides, for each economic sector, a different relative weight for each of the Funds A, B and C. In general, a sector based investment trust does not need to have as many as 11 sectors, or can have more than 11 sectors. Furthermore, a sector based investment trust can include broad sectors instead of including all sectors.

As described above, the investment trust includes funds A, B and C that enable systematic investment across several sectors of the market. After purchasing the above-described stock portfolio, regardless of the market conditions, the trust is basically passive (no significant stock purchases, sales or exchanges of individual companies) to enable time and the laws of compounding to work for long-term investors.

Referring to FIG. 6, Table IV illustrates another example of an investment trust that can focus on one particular sector such as telecommunication, pharmaceuticals, biotechnology, steel, transportation, semiconductors, computer hardware, computer software, oil and gas, chemicals, cosmetics, food and beverage, retail, etc. For example, the investment trust shown in Table IV includes only pharmaceutical and biotechnology stocks. This trust includes only one Fund divided into three tiers.

In the investment trust of Table IV, Tier 1 includes 30 stocks with the largest market capitalization starting with Pfizer Inc. and GlaxoSmithKline having market capitalization of about $250 billion and $170 billion, respectively. Tier 2 includes next 60 companies ranked by market capitalization, and Tier 3 includes the next 120 companies. Each tier uses a different weighting. In Tier 1, the stocks are weighted according to their bond rating (provided, for example, by Standard & Poor's), wherein the largest weighting is, for example, 4× the smallest weighting of stocks. The total purchase price for all stocks in Tier 1 is $300,000. In Tier 2, the stocks are weighted equally each having the purchase price of $2,500. In Tier 3, the stocks are weighted based on the strength of their balance sheet ranking, i.e., the ratio of debt and total capitalization. In Tier 3, the largest weighted stock for the strongest company is 2× the smallest weighted stock. The total purchase price for all stocks in Tier 3 is $100,000.

This investment trust enables systematic investment across several segments of the pharmaceutical and biotechnology sector. After purchasing the above-described stock portfolio, regardless of the market conditions, the trust is substantially passive to enable time and the laws of compounding to work for long-term investors.

Referring to FIG. 7, Table V illustrates another example of an investment trust, wherein most of the US market (or another foreign market) is segmented into three (or more) funds based the companies' capitalization (i.e., the ratio of debt to total capitalization), and each fund is divided into three (or more) tiers based on market capitalization. The companies are first ranked and then divided into Funds A, B, and C as follows: Fund A includes the top 20% capitalized companies, that is, companies with the strongest balance sheets measured by the ratio of debt to total capitalization (i.e., the lowest ratio of debt to total capitalization). Fund B includes the next best 30% capitalized companies, and Fund C includes the bottom 50% capitalized companies from the selected group of US companies. In Fund A, Tier 1 includes the largest 15% of the market by market capitalization, Tier II includes the next 25% companies, and Tier III includes the remaining 60% of companies by market capitalization. Funds B and C include a similar differentiation of the Tiers I, II and III, which is shown in Table V.

The investment trust shown in Table V enables systematic investment across several segments based on the balance sheet strength of the individual companies. Thus a "popular" company with a very large market cap but a large relative debt will be less represented than another company with a smaller market cap but a smaller debt to total capital ratio. After purchasing the above-described stock portfolio, regardless of the market conditions, the trust is substantially passive to enable time and the laws of compounding to work for long-term investors.

The following illustrates another example of a long-term investment trust. This investment trust is divided into funds A, B, and C, and includes a selected number of industries or sectors (e.g., 11 economic sectors that comprise the S&P sectors). The individual funds and sectors are arranged in a similar way as shown in Table III. Fund A includes the largest 10% of companies within each sector, wherein the ranking is based on one or several of the following: the annual sales, annual earnings, market capitalization, or book value. Fund B includes the next 30% of companies within each sector, and similarly Fund C includes the remaining 60% of companies within each sector determined the same way as for Fund A. The individual stocks within each fund and sector may be weighted equally or as done in Table I, II or III.

In this investment trust, for example, if a sector constitutes 30% of the market capitalization of the entire stock market then, ⅓ of the invested money is allocated into this sector is invested into Fund A, ⅓ is invested into Fund B, and the final ⅓ is invested into Trust C.

The following illustrates another example of a long-term investment trust based on price-to-earnings ratio. This long-term investment trust includes four funds. The trust is constructed to invest strategically in the entire market without having a "growth" or "value" bias, or invest in predominantly growth or value stocks. Specifically, the investment trust includes Funds A, B, C, and D. Fund A contains the most expensive 25% companies ranked by the ratio of price-to-earnings for each industry group or economic sector. Fund B includes the next 25% companies ranked by the ratio of price-to-earnings for each industry group or economic sector. Fund C includes the next 25% companies ranked the same way for each industry group or economic sector. Finally, Fund D includes the least expensive (lowest) 25% companies ranked by the ratio of price-to-earning for each industry group or economic sector.

Alternatively, this investment trust includes Funds A, B, C, and D ranked by the ratio of price-to-sales. Specifically, Fund A includes the most expensive 25% companies ranked by the ratio of price-to-sales for each industry group or economic sector. Fund B includes the next most expensive 25% companies ranked by the ratio of price-to-sales for each industry group or economic sector. Fund C includes the next 25% companies ranked the same way for each industry group or economic. Finally, Fund D includes the least expensive (lowest) 25% companies ranked by the ratio of price-to-sales for each industry group or economic sector. Alternatively, the companies in any fund or several funds may be selected or may be ranked by the price-to-book ratio.

This investment trust enables systematic investment across several segments based on the ratio of price-to-earnings or price-to-sales (or price-to-book) for the individual companies. After purchasing the stock portfolio of Funds A, B, C or D, regardless of the market conditions, the trust is substantially passive to enable time and the laws of compounding to work for long-term investors. The trust can offer a single type of shares, or can offer four types of shares corresponding to Funds A, B, C or D. The single type shares offer a systematic investment across the broad market based on a value measure. Alternatively, an investor can buy only shares of Fund A (or only shares of Funds A and B) to acquire in order to allocate her/his money just into a "growth" portfolio, or can buy only shares of Fund D (or only shares of Funds C and D) to acquire an in order to allocate her/his money just into a "value" portfolio.

According to another example, an investment trust has five funds, i.e., Funds A, B, C, D, and E. Fund A has top 50 companies according to market capitalization. Fund B has next 150 companies, Fund C has next 400 companies, Fund D has next 1,000 companies, and Fund E has the bottom 2,000 companies from the selected 3,600 companies. In each of the funds, the dollar allocation for all companies is the same. In Fund A, each of the 50 largest companies receives a dollar allocation of 25× allocation of a company from Fund E; in Fund B, each of the 150 companies receives an allocation of 15×; in Fund C each of the 400 companies receives an allocation 8×; and in Fund D, each of the 1000 companies receives an allocation of 3× the allocation of a company from Fund E. If the total of $1,170,000 is invested into this investment trust, for example, each company in Fund A will be allocated $2500; each company in Fund B will be allocated $1500; each company in Fund C will be allocated $800; each company in Fund D will be allocated $300; and each company in Fund E will be allocated $100.

According to another example, in any of the above-described funds, the allocation of the individual securities is based on weight coefficients assigned using geometric series or arithmetic series (or other series such as Fourier series, Taylor series, or other math algorithms). For example, one possible array of weight coefficients could entail a doubling in weight coefficient from one group to the next (e.g. 1×, 2×, 4×, 8×, 16× and 32×). The inverse of this geometric series could be utilized to determine the number of securities in each of the prospective groups. Specifically the number of securities in the group with the 32:1 weight coefficient would be just $\frac{1}{32}$ of the number of securities found in the group with the 1:1 weight coefficient.

Alternatively, according to another example, the weight coefficients are assigned based on an algorithm that entails assigning a larger weight coefficient to groups with smaller number of stocks, but the weight coefficient and group size coefficients would not be specified as a function of an arithmetic series, geometric series, or other series. For instance, if 4 separate trusts were formed (e.g. companies 1 through 100, 101 to 300, 301 to 700 and 701 to 1800) and the top 25 percent in each group could receive weight coefficients of 7:1, and the smallest 25% in the group and the middle 50% could receive weight coefficients 3:1.

The entire process of creating and managing the above described funds or trusts can be computerized requiring only a minimal input by a user. The computer system includes a dynamic management system arranged to create and manage the investment portfolios. The computer system connects, for example, to a trade execution computer. The computer system generates a list of trades to be made through execution of appropriate conventional software. The trades are transmitted via the communications network for execution. The computer system provides data processing for monitoring and recording the information flow and data and making all calculations necessary for maintaining set of different portfolios. Data processing system provides for a daily calculation of assets for the individual funds or trusts. The data processing system also tracks all the relevant data determined on a periodic basis (month, week, day, or an hour) for the portfolio, determines aggregate year-end income (including capital gains or losses) for accounting and for tax purposes for the portfolio and for each fund.

The individual portfolios may be part of a pension or retirement account such as IRA, Keogh, S.E.P., or corporate pension plan. The investments may also include the purchase of tax-favored investments such as life insurance or annuities which earnings on premium payments or insider buildup and not taxed until they are withdrawn. Furthermore, due to the possible diversification and/or other above-described features, the present method, system and investment product are well suited for investing social security funds by the government, or individuals once enabled by a statute.

The above-described funds or trusts use a novel, buy and hold approach that takes advantage of compounding over many years or even decades. The above-described investment approach is passive since it is based on fixed portfolio. Furthermore, the above-described investment approach is also dynamic since new funds and trusts can be created using the same methodology at regular intervals so that investors get a practical way of systematically investing over time using a consistent strategy. In short, new funds can be created over regular periodic intervals and they can include companies that meet specified market capitalization, geographic and/or valuation criteria.

Based on different creation times, the funds and trusts include new potential "winners". In general, "winners" overwhelm "losers" over long periods of time (e.g. 2, 3, 4 or more years) and drive performance. While it is impossible to know the future investment returns for individual stocks and thus select only small companies that perform at an above average rate the above approach enables systematic inclusion of all future "winners" at much larger representations than other investment vehicles. Note that no stock is limited to grow over time relative to other stocks in the portfolio (i.e., there is no relative weighting limit for a high-performing stock relative to other stocks).

The above approach enables these high-performing "winners" to run without effectively selling them when they become too large to qualify in index funds as "micro cap" or "small cap" stocks. The above approach also enables low cost investing and takes advantage of the magic of compounding, wherein the geometric average is always greater than the arithmetic and is driven by the above average growth component(s).

Numerous other embodiments not described in detail here can apply the principles described to particular applications and are within the scope of the claims.

What is claimed is:

1. A method of creating an investment fund or an investment trust, comprising acts of:

using a computer to identify, according to one or more criteria, a plurality of financial instruments publicly traded on an exchange, each financial instrument being associated with a company;

grouping the plurality of financial instruments, based on market capitalization according to a criterion, into at least a first group of financial instruments and a second group of financial instruments, each financial instrument of the first group of financial instruments being associated with a company having a market capitalization that is larger than the market capitalization of each company associated with each financial instrument of the second group;

using a computer to allocate a weight coefficient to each of said identified financial instruments based on a value of the market capitalization of each associated company relative to values of the market capitalization of others of the companies associated with the plurality of identified financial instruments;

wherein allocating weight coefficients includes assigning a weight coefficient to each of the plurality of financial instruments such that for substantially any financial instrument associated with a first company having a market capitalization that is larger than a market capitalization of a second company, the financial instrument associated with the first company is assigned a weight coefficient that is greater than or substantially equal to the weight coefficient assigned to the financial instrument associated with the second company;

wherein allocating weight coefficients includes assigning a weight coefficient to each of the plurality of financial instruments such that for each of the financial instruments of the first group, a ratio of (a) a first weight coefficient assigned to a first financial instrument of the first group to (b) a second weight coefficient assigned to a second financial instrument of the second group is less than a ratio of (c) the value of the market capitalization of the company associated with the first financial instrument to (d) the value of the market capitalization of the company associated with the second financial instrument;

creating an investment fund or an investment trust based on the identified financial instruments and the allocated weight coefficients by using a computer to purchase an amount of each of the identified financial instruments, the purchased amount being based on the weight coefficients; and substantially maintaining said purchased financial instruments for more than two years.

2. The method of claim 1, wherein allocating a weight coefficient to each of the identified financial instruments further comprises selecting a maximum ratio of a largest weight coefficient relative to a smallest weight coefficient, wherein the maximum ratio is less than a ratio of i) the market capitalization of the company associated with the financial instrument to which the largest weight coefficient is assigned to ii) the market capitalization of the company associated with the financial instrument to which the smallest weight coefficient is assigned.

3. The method of claim 1 wherein substantially maintaining said purchased financial instruments for more than two years includes allowing reinvestment of dividends during the more than two years.

4. The method of claim 1 wherein substantially maintaining said purchased financial instruments for more than two years includes receiving new shares from spin-offs, mergers or acquisitions without subsequent selling during the more than two years.

5. The method of claim 1 wherein substantially maintaining said purchased financial instruments for more than two years includes putting cash proceeds into a money market fund during the more than two years.

6. The method of claim 1 wherein substantially maintaining said purchased financial instruments for more than two years includes distributing proceeds to investors during the more than two years.

7. The method of claim 1 wherein identifying financial instruments according to one or more criteria includes identifying stocks of the one thousand publicly traded companies having the largest one thousand market capitalizations and choosing a market segment.

8. The method of claim 1 wherein identifying financial instruments according to one or more criteria includes identifying stocks of the three thousand publicly traded companies having the largest three thousand market capitalizations and choosing a market segment.

9. The method of claim 1 wherein identifying financial instruments according to one or more criteria includes identifying stocks of the five thousand publicly traded companies having the largest five thousand market capitalizations and choosing a market segment.

10. The method of claim 1 wherein identifying financial instruments according to one or more criteria includes identifying stocks from a particular sector.

11. The method of claim 10 wherein said sector is one of the following: health care, information technology, telecommunications, energy, utilities, and transportation.

12. The method of claim 1 wherein allocating a weight coefficient to each of the identified financial instruments includes dividing the identified financial instruments into a plurality of groups based on the market capitalizations of the companies associated with the identified financial instruments and, for each of the plurality of groups, allocating the same weight coefficient for all of the financial instruments in the group.

13. The method of claim 12 wherein the plurality of groups comprises exactly three groups, and a first group, a second group and a third group include 20 percent, 60 percent, and 20 percent, respectively, of the plurality of financial instruments.

14. The method of claim 13 wherein the purchase amount of each financial instrument in said first group is three times the purchase amount of each financial instrument in said third group.

15. The method of claim 14 wherein the purchase amount of each financial instrument in said second group is two times the purchase amount of each financial instrument in said third group.

16. The method of claim 1 wherein said financial instruments include one or more of the following: common stocks, derivatives, stock options, commodity futures, and bonds.

17. The method of claim 1, wherein creating an investment fund or an investment trust comprises creating a mutual fund.

18. The method of claim 1, wherein creating an investment fund or an investment trust comprises creating a closed-end fund.

19. The method of claim 1, wherein creating an investment fund or an investment trust comprises creating a unit investment trust.

20. At least one computer readable medium having stored thereon instructions which, when executed by a processor, implement a method comprising:

identifying, according to one or more criteria input by a user, a plurality of financial instruments publicly traded on an exchange, each financial instrument being associated with a company;

grouping the plurality of financial instruments, based on market capitalization according to a criterion, into at least a first group of financial instruments and a second group of financial instruments, each financial instrument of the first group of financial instruments being associated with a company having a market capitalization that is larger than the market capitalization of each company associated with each financial instrument of the second group;

allocating a weight coefficient corresponding to each of said identified financial instruments based on a value of the market capitalization of each associated company relative to values of the market capitalization of others of the companies associated with the plurality of identified financial instruments;

wherein allocating weight coefficients includes assigning a weight coefficient to each of the plurality of financial instruments such that for substantially any financial instrument associated with a first company having a market capitalization that is larger than a market capitalization of a second company, the financial instrument associated with the first company is assigned a weight coefficient that is greater than or substantially equal to the weight coefficient assigned to the financial instrument associated with the second company;

wherein allocating weight coefficients includes assigning a weight coefficient to each of the plurality of financial instruments such that for each of the financial instruments of the first group, a ratio of (a) a first weight coefficient assigned to a first financial instrument of the first group to (b) a second weight coefficient assigned to a second financial instrument of the second group is less than a ratio of (c) the value of the market capitalization of the company associated with the first financial instrument to (d) the value of the market capitalization of the company associated with the second financial instrument;

indicating, based on the weight coefficients, an amount of each of the identified financial instruments to be purchased and held for more than two years.

21. The method of claim 1, wherein identifying a plurality of financial instruments comprises identifying at least fifty financial instruments.

22. The method of claim 1, wherein substantially maintaining said purchased financial instruments for more than two years comprises substantially maintaining said purchased financial instruments for more than three years.

23. The method of claim 1, wherein substantially maintaining said purchased financial instruments for more than two years comprises substantially maintaining said purchased financial instruments for at least ten years.

24. The method of claim 1, wherein substantially maintaining said purchased financial instruments for more than two years comprises substantially maintaining said purchased financial instruments for more than two years.

25. The method of claim 1, wherein identifying financial instruments includes identifying growth stocks.

26. The method of claim 1, wherein identifying financial instruments includes identifying value stocks.

27. The method of claim 1 wherein purchasing the identified financial instruments comprises purchasing the identified financial instruments over time based on said initially allocated weight coefficients.

28. The method of claim 1 wherein identifying financial instruments according to one or more criteria includes identifying financial instruments associated with the one thousand publicly traded companies having the largest one thousand market capitalizations.

29. The method of claim 1 wherein identifying financial instruments according to one or more criteria includes identifying financial instruments associated with the three thousand publicly traded companies having the largest three thousand market capitalizations.

30. The method of claim 1 wherein identifying financial instruments according to one or more criteria includes identifying financial instruments associated with the five thousand publicly traded companies having the largest five thousand market capitalizations.

31. The method of claim 2 wherein said maximum ratio is 100.

32. The method of claim 1, wherein the purchased amount of each of the identified financial instruments is based only on the weight coefficients and a total amount of all the identified financial instruments being purchased.

33. The method of claim 1, wherein identifying, according to one or more criteria, a plurality of financial instruments publicly traded on an exchange comprises identifying a plurality of financial instruments publicly traded on an exchange according to one or more criteria input by a user.

34. The method of claim 12 wherein the selected financial instruments include one or more of the following: common stocks, derivatives, stock options, commodity futures, and bonds.

35. The computer readable medium of claim 20, wherein the identified financial instruments associated with companies having a market capitalization that is amongst the bottom one third of the market capitalizations of the companies that are associated with the plurality of financial instruments are allocated weight coefficients that assure that at the time of purchase, at least fifteen percent of the entire value of all of the financial instruments to be purchased is allocated to the financial instruments associated with companies having a market capitalization that is amongst the bottom one third of the market capitalizations of the companies that are associated with the plurality of financial instruments.

36. The method of claim 1, wherein allocating a weight coefficient to each of said identified financial instruments based on a value of the market capitalization of each associated company relative to values of the market capitalization of others of the companies associated with the plurality of identified financial instruments comprises:

allocating a weight coefficient to each of said identified financial instruments based only on a value of the market capitalization of each associated company relative to values of the market capitalization of others of the companies associated with the plurality of identified financial instruments.

* * * * *